United States Patent [19]
Walker et al.

[11] Patent Number: 5,995,976
[45] Date of Patent: Nov. 30, 1999

[54] METHOD AND APPARATUS FOR DISTRIBUTING SUPPLEMENTAL INFORMATION RELATED TO PRINTED ARTICLES

[75] Inventors: Jay S. Walker; T. Scott Case, both of Stamford, Conn.

[73] Assignee: Walker Asset Management Limited Partnership, Stamford, Conn.

[21] Appl. No.: 08/729,426

[22] Filed: Oct. 11, 1996

[51] Int. Cl.[6] .................................................. G06F 17/30
[52] U.S. Cl. ............................................. 707/104; 707/10
[58] Field of Search .................. 707/104, 1, 2, 707/10

[56] References Cited

U.S. PATENT DOCUMENTS

| | | | |
|---|---|---|---|
| 5,794,207 | 8/1998 | Walker et al. | 705/23 |
| 5,799,268 | 8/1998 | Boguraev | 704/9 |
| 5,799,285 | 8/1998 | Klingman | 705/26 |
| 5,835,923 | 11/1998 | Shibata et al. | 707/526 |

*Primary Examiner*—Thomas G. Black
*Assistant Examiner*—Frantz Coby
*Attorney, Agent, or Firm*—Patrick J. Buckley; Jeffrey L. Brandt

[57] ABSTRACT

A method for readers of standard-length articles in magazines, newspapers, or similar printed media to purchase supplemental information on portions of information in the articles from publishers that print the articles, operators of electronic databases containing the supplemental information, or third party intermediaries handling requests for supplemental information. Embedded in the midst of the printed articles is a code that is physically positioned to identify a limited portion of information in the printed article. A reader may use the code to indicate further interest in supplemental information located in an electronic database, and to select a method of delivery whereby the supplemental information in the database can be delivered the reader.

39 Claims, 12 Drawing Sheets

| CUSTOMER NUMBER 282 | NAME 284 | ADDRESS 286 | PHONE NUMBER 288 | FAX NUMBER 290 | E-MAIL ADDRESS 292 | CREDIT CARD NUMBER 294 | PREFFERRED DELIVERY SERVICE 296 | ACCOUNT BALANCE 298 |
|---|---|---|---|---|---|---|---|---|
| | | | | | | | | |
| | | | | | | | | |
| | | | | | | | | |
| | | | | | | | | |

METHOD AND APPARATUS FOR DISTRIBUTING SUPPLEMENTAL INFORMATION RELATED TO PRINTED ARTICLES

BACKGROUND OF THE INVENTION

A. Field of the Invention

This invention relates to electronic commerce and, more particularly, to methods and apparatus for the online sale and distribution of information corresponding to portions of printed articles.

B. Description of the Related Art

Publishers of newspapers, magazines, and the like that gather and distribute information waste tremendous amounts of information daily by not distributing some of the information due to limitations on the space available for a particular article or story. They invest vast amounts of money and time in gathering the information. As the space limitations increase, however, those investments in information gathering fail to provide an adequate return because much of the information cannot be used. In other words, if the publishers cannot include information in the media for which they receive compensation from readers, they are unable to capitalize on the expenditures associated with gathering that information. There is thus a need for techniques to permit the publishers to obtain a return on the enormous investment associated with the gathering of information that they cannot currently include in the media for which they receive compensation.

Computer online services provide the basis of a growing market for electronic commerce and, in particular, the sale of information. Perhaps the best known example of this is the Lexis/Nexis® service that controls terabytes of data contained in hundreds of databases, and makes the data available for sale.

Until recently, access to online services was relatively expensive, both due to high access charges and high equipment costs. As a result, online information purchases were primarily practiced by corporate, government and professional users. The dramatic success of consumer online services such as America Online and CompuServe, as well as the explosive growth of the Internet, now makes information sales to millions of consumers a potentially viable and profitable market. Though problems remain with the ability of websites to levy charges for small packets of information, millions of consumers already use online services to tap into databases and find useful information stored within them.

Many companies possess large amounts of information as an integral part of their business. Naturally, these companies are always searching for new ways to derive revenue from that information. In much the same way that telephone companies have learned to derive substantial directory assistance revenues simply by providing "pay-per-lookup" access to their databases of customers and associated telephone numbers, companies who have large storehouses of data want to design practical systems for selling access to such data.

The desire to capitalize on the value locked within their information base is especially important to companies who collect, edit, package and distribute data as their primary business purpose, such as the news media. Due to advances in computer technology, news organizations store almost all written information gathered as part of the news process in digital form on computer systems with substantial storage capacities. Frequently, news organizations also store audio and visual information, such as tape recordings, pictures, and video, related to a given story in digital databases.

Moreover, searching online databases is now an integral part of the research done in the preparation of news story. Reporters worldwide, whether they work for newspapers, magazines, newsletters, wire services or radio or TV stations, typically use computers to gather and evaluate relevant information for eventual editing and dissemination.

Computers make it fast, easy, and inexpensive to gather and store large amounts of material relevant to a single story. As a result, most companies who collect and distribute editorial information, such as news stories, generate at great expense far more finished material than they disseminate in the "news-hole" for that particular story. It is axiomatic that the total information gathered for a given story always far exceeds the standard-length or space allocated for the distribution of the story. Writers, and more frequently editors, must cut and condense each story in a never ending battle to make it fit within the finite amount of available space. The space can take the form of air time, as is the case for TV and radio, or column inches on a printed page, as is the case with magazines, newspapers, newsletters, etc.

Information gathered and not published for a given story can best be characterized as surplus information. For typical news media, such surplus information has little value beyond simply storing it in an archive for possible future use.

For online services, however, the situation of surplus information is very different. Because online services have a "news-hole" limited solely by electronic storage space, and because the cost to store information in digital format is extremely low, online services can provide access to the total information they gather on a given story and derive revenue from the total story. Online services have no surplus information that they have paid to gather but cannot at least attempt to sell. Their only economic limitation is the number of subscribers who can find the information and deem it valuable.

Users of online services often enjoy a second significant advantage. Typically, hyperlink connections exist within articles stored in databases. These links allow users interested in more information about a specific text passage to jump directly from that passage to another location for relevant information. Thus, online users can create and follow unanticipated paths of information retrieval that allow them to better accomplish their information-gathering objectives.

The subscribers of offline information services are thus at a significant disadvantage compared to users of online services. They lack access to the surplus information and they lack an ability to locate information related to the story they are reading or viewing quickly and easily.

Publishers, specifically those using printed forms of information, have begun to develop limited ways to allow their readers access to supplemental information remotely stored in electronic form. They sometimes provide access via footnote-like codes, such as Internet website addresses. In some cases, publishers derive added revenue by providing access to supplemental information. In other cases, publishers provide access to supplemental information to enhance the total reader value of a media package.

For example, readers of magazines such as Internet World often find website addresses at the end of articles with a notation that readers can visit the websites to learn additional information. In some cases, publishers incorporate the website addresses within the body of the articles, especially when the articles refer to a service which is itself website-based.

Newspapers such as the Wall Street Journal® produce an electronic version of the newspaper that users can access via the Internet. The primary advantage of this service is that users can retrieve previously published articles.

Wired® magazine has gone a step further in offering supplemental editorial information to its readers. For example, in a recent article discussing a writer's interview with a specific person, the magazine offered the full text of the interview to subscribers. Computer users with Internet access could visit the Wired® website for the full text of the interview available at no charge to users. Those without Internet access, however, had no way to access the supplemental information.

Systems currently exist which use indicia, specifically code numbers, that appear on the printed page and provide readers with instructions on how to access supplemental information electronically without the need for a computer, Internet access, or an online connection. For example, an advertisement for medical information produced by Medical Information Line lists various medical topics with associated code numbers. According to this system, the reader calls a special 900 number, enters the code number for the topic of interest, and listens to a three-minute prerecorded article covering the topic. The reader's telephone bill is billed for the cost of the article.

Other forms of advertising, specifically trade magazine advertising, incorporate another form of information request code within their advertisements. These code numbers, assigned by the magazine in which the advertisement appears, are so-called reader service numbers. A reader selects from a list of such numbers on a special postcard in the magazine and mails the postcard to the publisher who notifies each of the selected advertisers that the reader desires more information.

Fax-on-demand services provide a faster version of a reader service system. With fax-on-demand, a reader can call a telephone number in an advertisement and indicate a desire to have additional information immediately sent to him at a telephone number designated for a facsimile machine. In some cases, the reader can navigate lists of possible choices using an interactive voice response unit (IVRU) to specify products or services about which he is interested in receiving more information.

Individual Inc. offers another type of service where a one- or two-page document containing a few dozen news article abstracts is faxed to subscribers each day. The abstracts are based on search parameters set by the subscriber. A service scans tens of thousands of articles each day to select those articles that, based on their keyword content, might be of interest to the subscriber. A code number appended to the end of each abstract provides the subscriber access to the complete article. To obtain the article, the subscriber merely calls a telephone number, and enters an ID code and the code number for the abstract of interest. The service then sends the article by facsimile machine and, in some cases, charges the user an additional cost for complete article.

Fortune magazine provides a similar advertising-driven, fax-on-demand service that enables subscribers to obtain company information. Subscribers can call a telephone number and request company information, SEC filings, or certain articles on any of thousands of public companies. The service then immediately sends the requested information to the reader by facsimile machine. The reader must know only the company's stock ticker symbol in order to be able to use this type of IVRU-based system to identify and request the information he seeks.

Classified advertisement audio codes are another way to receive supplemental information. Some newspapers allow consumers who place classified personal advertisements to record a brief message for anyone who wants to listen. Each classified advertisement includes a printed code number that the reader keys into his telephone after calling an IVRU system at the newspaper. The newspapers typically charge the advertiser an additional fee for using this enhanced service.

These systems can be classified into four categories: (1) advertisers who incorporate code numbers in advertisements that readers use to request certain information at no charge; (2) advertisers who incorporate code numbers to allow readers to purchase information; (3) editorial information that allows the reader to purchase the full text of an abstract which was originally provided; (4) editorial information for which supplemental information is provided free. All of these system share the same disadvantage. Specifically, they fail to provide a simple and economical facility for publishers to distribute and to derive added revenue for supplemental information related to printed information.

It is therefore desirable to seek techniques that can provide those that gather information for newspapers, magazines, and the like to distribute and to benefit financially from the distribution of surplus information related to information appearing in print and other media. Such gatherers typically have limited space to disseminate information via traditional avenues such as print media This limitation may be due primarily to the cost of the particular media, although production costs may also play a role. As a result, information gatherers currently waste the surplus information by not disseminating it and reaping financial benefits associated with distributing information in available media.

SUMMARY OF THE INVENTION

In accordance with the present invention, a practical and effective method provides information gatherers such as newspapers a means of selling information that would otherwise be wasted. They can now provide readers of standard-length articles in magazines, newspapers, or similar printed media with the capability to obtain supplemental information on selected segments of information in the articles. Readers may obtain the supplemental information directly from publishers that print the articles, operators of electronic databases containing the supplemental information, or third party intermediaries handling requests for supplemental information.

In accordance with one aspect of the invention, as embodied and broadly described herein, publishers provide standard-length printed articles that are intended to inform and/or entertain readers. Embedded in the midst of at least one of the printed articles is a code that is physically positioned to identify a limited portion of information in the printed article. A reader may use the code to indicate further interest in supplemental information located in an electronic database, and to select a method of delivery whereby the supplemental information in the database can be delivered the reader.

In accordance with another aspect of the present invention, a publisher embeds a code in a standard-length printed article intended to inform and/or entertain readers. The code is physically positioned to identify a limited portion of information in the article. The reader is provided written instructions associated with the article that permit the reader to access a remote electronic database containing supplemental information related to the limited portion of information in the article, utilize the code to indicate further interest in the supplemental information, and select a method of delivering the supplemental information in the database to the reader.

In accordance with yet another aspect of the present invention, a party owning, managing, or operating an electronic database of supplemental information related to printed articles from magazines, newspapers, or similar printed media may provide the supplemental information to interested readers. To do this, the database owner would receive from a reader a code indicating a limited portion of information in an otherwise standard-length printed article. The database owner utilizes the received code to identify a portion of the electronic database containing supplemental information about the printed article. The database owner also provides to the reader a selection of methods of delivery of the supplemental information, and initiates delivery of the supplemental information from the electronic database to the reader in accordance with the reader's selection of a method of delivery.

In accordance with still another aspect of the present invention, an intermediary assists readers to obtain supplemental information. The intermediary receives from a reader a code indicating a limited portion of information in an otherwise standard-length printed article intended to inform the reader. The intermediary contacts a remote electronic database and, utilizing the code, identifies a portion of the remote electronic database containing supplemental information to the article. The intermediary also provides to the reader a selection of methods of delivery of the supplemental information to the reader, and initiates delivery of the supplemental information from the remote database to the reader in accordance with the reader's selection of method of delivery.

BRIEF DESCRIPTION OF THE DRAWINGS

The accompanying drawings, which are incorporated in and constitute a part of this specification illustrate an implementation of the invention and, together with the description, explain the advantages and principles of the invention. In the drawings.

FIGS. 3a–d illustrate the fields of a printed information database, hyper-footnote database, supplemental information database, and user information database of the central controller used by the information distribution system;

DETAILED DESCRIPTION

Reference will now be made in detail to an implementation of the present invention illustrated in the accompanying drawings. Wherever possible, the same reference numbers will be used throughout the drawings and the following description to refer to the same or like parts.

Standard components preferably include conventional computers, telecommunications services, and input and output devices such as telephones, computer terminals, printers, and facsimile machines. The architecture for and procedures to implement data handling among these machines, however, are not conventional, as they provide for distribution of supplemental information corresponding to portions of printed articles.

Figure 1:
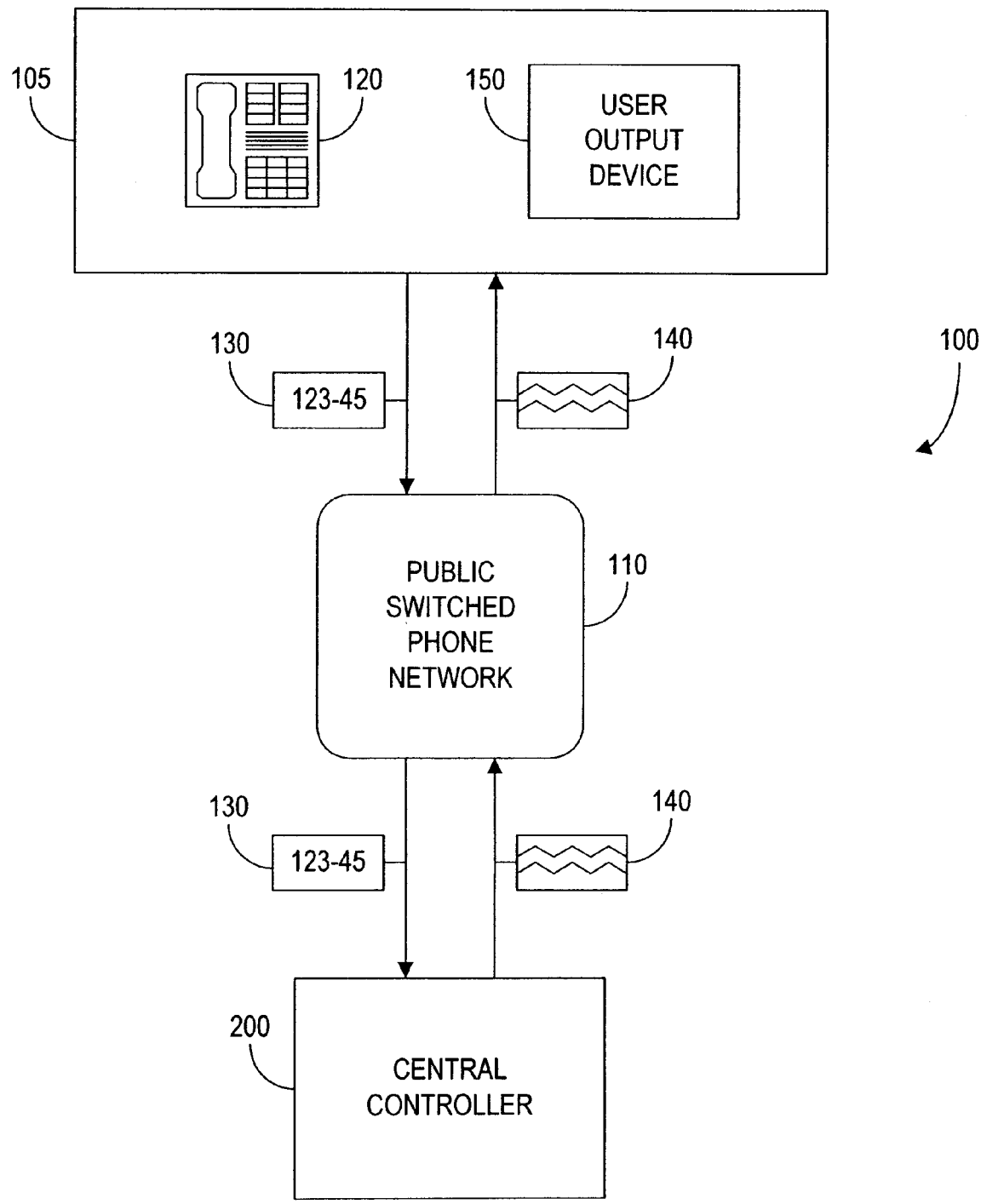
FIG. 1 is a block diagram of an information distribution system according to an implementation of the present invention.

FIG. 1 is a block diagram of information distribution system 100 according to an implementation of the present invention. As illustrated, system 100 includes user location 105, public switched telephone network 110, and central controller 200. User location 105 includes a user input device 120, which, as illustrated, may be a telephone. User location 105 also includes a user output device 150, which, as illustrated, may be a printer. Those skilled in the art will recognize that user input device 120 may be any electronic input device connectable to central controller 200, such as a computer with a modem for connecting to central controller 200 via public switched telephone network 10. Similarly, user output device 150 may be any type of output device such as a computer terminal, facsimile machine, etc. Output device 150 also represents an e-mail address, website, or the like, to which central controller 200 may send requested information.

Public switched telephone network 110 is a conventional public switched telephone network of the type operated by telephone companies like MCI, AT&T, NYNEX, Bell Atlantic, etc.

Lastly, central controller 200 includes a conventional server computer system, that responds in near real-time to requests for stored information. Central controller 200 also executes software to store and manage supplemental information related to portions of information found in, for example, printed articles, and to distribute the stored supplemental information upon request.

As shown in FIG. 1, a user transmits a request using user input device 120. The request initiates a process to locate, retrieve, and transmit to the user supplemental information related to a portion of information found in a printed article. The request includes a hyper-footnote 130, in this case "123-45." As used herein, hyper-footnote means a code or other indicator identifying a limited portion of information in the article for which supplemental information exists. The code may be printed or embedded in the midst of an article, or as described more fully hereinbelow, it may be otherwise discernable or calculable by a reader.

Publishers of printed articles either embed hyper-footnotes in the articles next to related portions of information or designate portions of information as corresponding to hyper-footnotes. To designate portions of information as corresponding to hyper-footnotes, publishers may alter the appearance of a portion of information in the printed articles. This altered appearance signals a hyper-footnote for supplemental information related to the portion of information.

Central controller 200 receives the user's request, including hyper-footnote 130, via public switched telephone network 110. Central controller 200 determines whether any supplemental information 140 corresponding to the received hyper-footnote 130 exists. If so, central controller 200 retrieves the requested supplemental information from a supplemental information database, and sends the retrieved supplemental information 140 to a user-specified location, such as user output device 150. Those skilled in the art will recognize that user input device 120 and user output device 150 may be at different locations, in which case the request transmitted to central controller 200 would include an identity and/or location of user output device 150 to which supplemental information should be sent. Additionally, as discussed below, users pre-register with central controller 200 before it will provide requested supplemental information. As part of the registration process, the users may specify a preferred output device to which central controller 200 will transmit any requested supplemental information.

Figure 2:
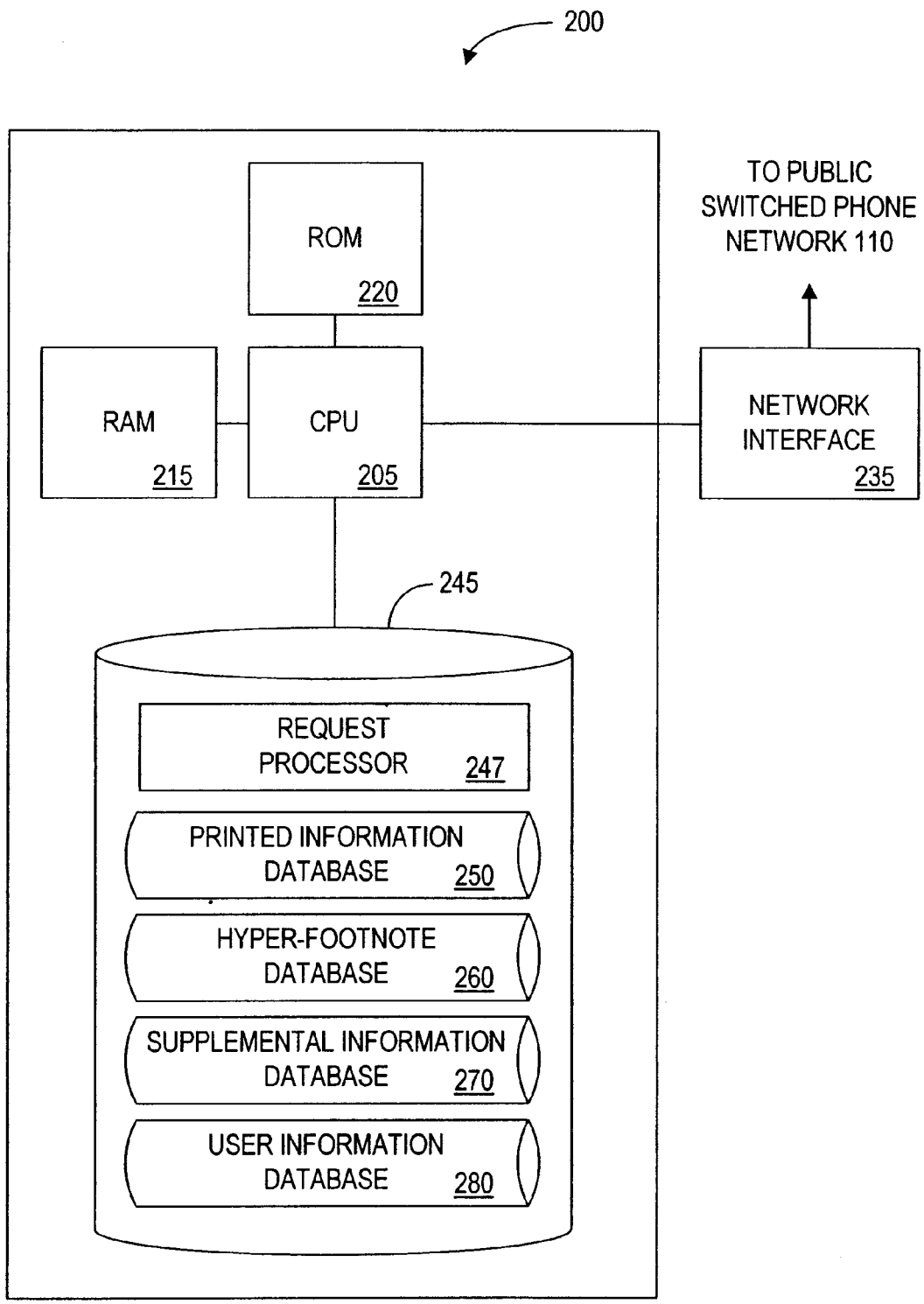
FIG. 2 is a block diagram of the components of a central controller used by the information distribution system of FIG. 1.

FIG. 2 is a block diagram of the components of central controller 200. Central controller 200 is connectable to a conventional network interface device 235, to connect central controller 200 to public switched telephone network 110. At the heart of central controller 200 is CPU 205. CPU 205 connects to RAM 215, ROM 220, and storage device 245. CPU 205 represents one or more microprocessors such as the Pentium® processor manufactured by Intel Corporation. RAM 215 and ROM 220 are also conventional. CPU 205, RAM 215, and ROM 220 are used in conventional ways to process requests for supplemental information in accordance with stored instructions, i.e., computer software.

Storage device 245 is a conventional mass storage device such as a hard disk. It may also include multiple mass storage devices, including both read-write devices and write-once read many times devices like optical disk drives. Storage device 245 includes a request processor 247 and multiple databases 250–280.

Request processor 247 constitutes computer software executed by CPU 205 for processing the requests for supplemental information related to a portion of information found in a printed article. Using information maintained by databases 250–280, CPU 205 processes requests for supplemental information in accordance with instructions of request processor 247.

Storage device 245 also includes a printed information database 250, a hyper-footnote database 260, a supplemental information database 270, and a user information database 280. Databases 250–280 may include various types of database structures. The preferred database structure is a relational database because it provides rapid responses to requests for supplemental information.

In general, printed information database 250 holds information on printed articles, including hyper-footnotes related to portions of information of the printed articles for which supplemental information exists. Hyper-footnote database 260 includes a listing of hyper-footnotes and corresponding supplemental information identifiers used to locate corresponding supplemental information in the supplemental information database 270. Supplemental information database 270 stores the supplemental information corresponding to portions of information in printed articles. Lastly, user information database 280 contains information on registered customers who have registered to receive supplemental information.

Figure 3A:
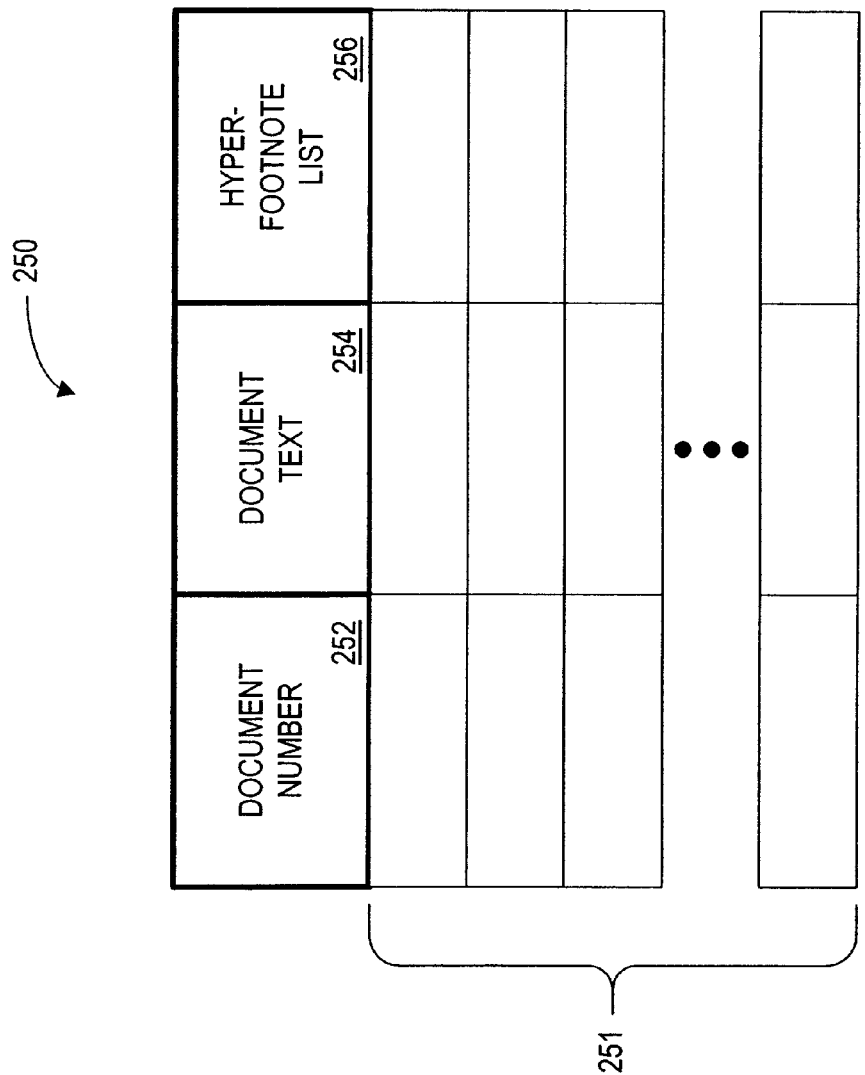
Figure 3B:
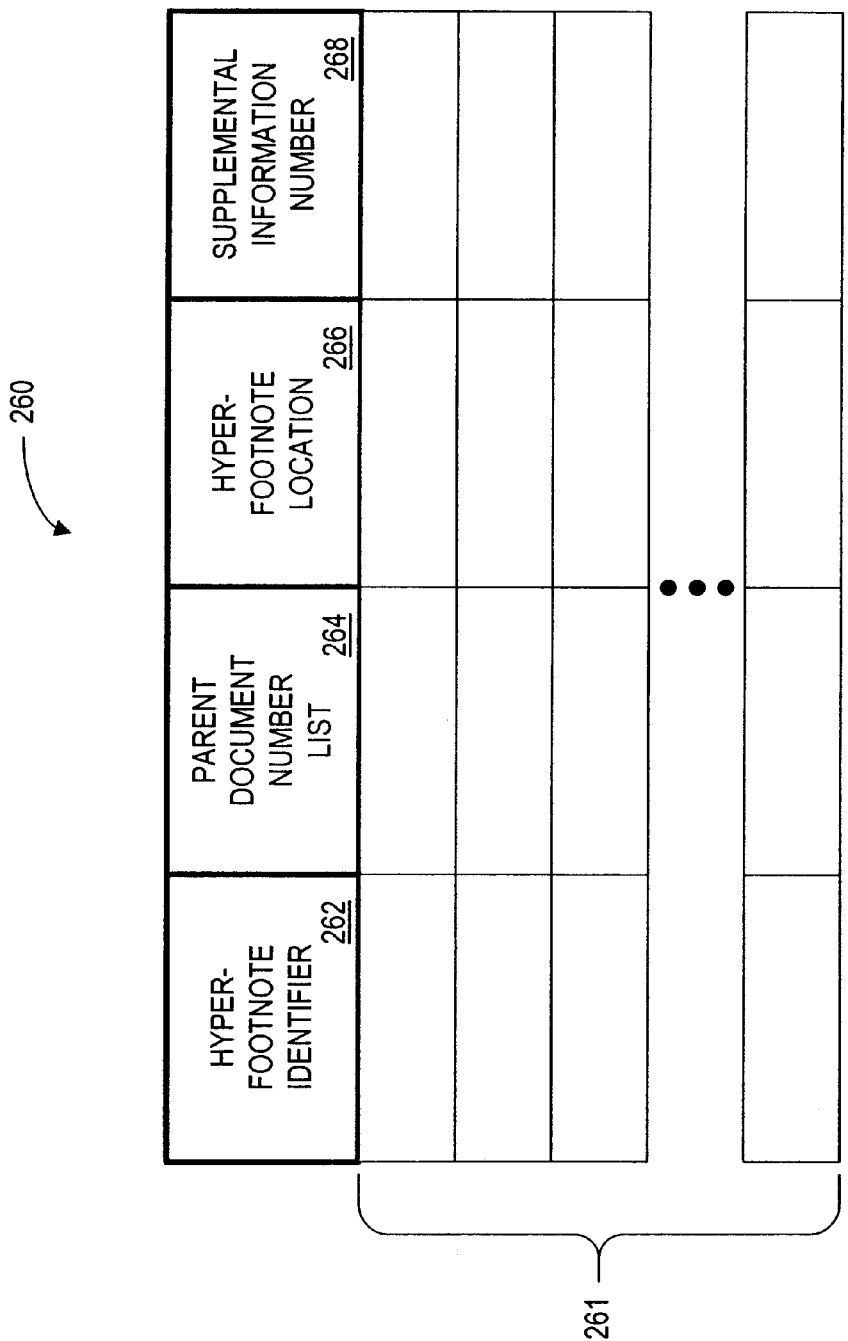
Figure 3C:
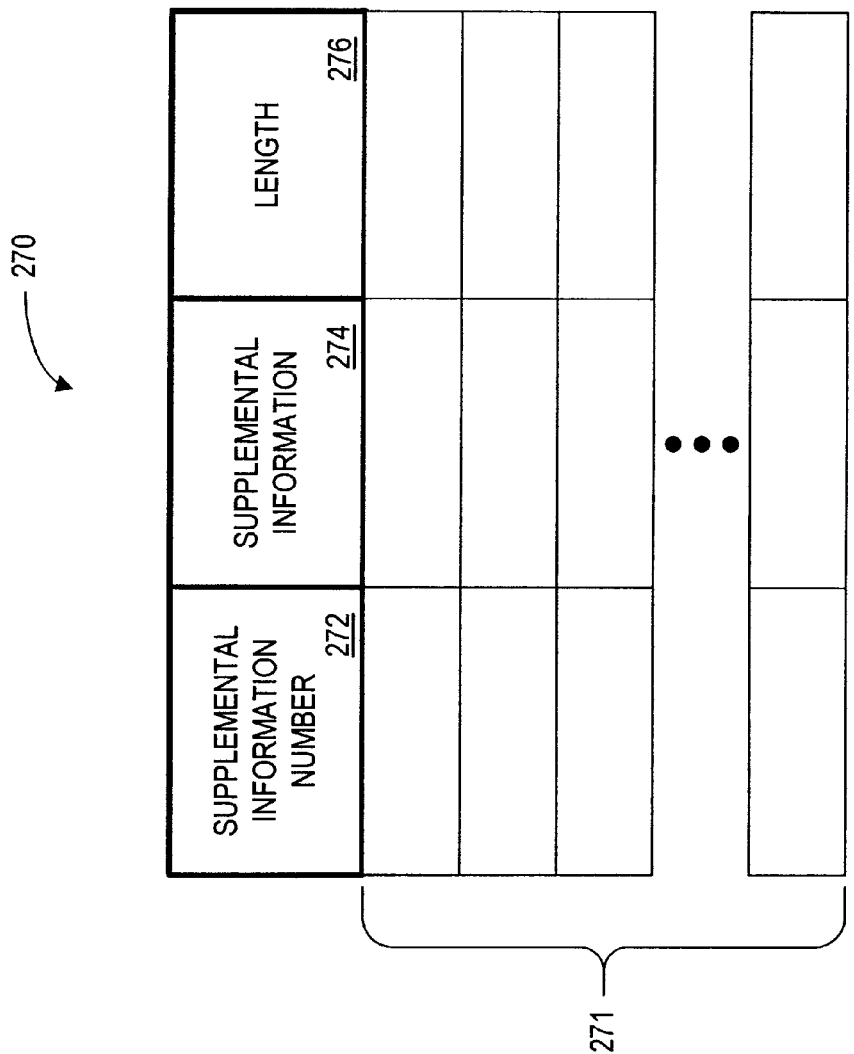

FIG. 3a illustrates the fields of printed information database 250. FIG. 3b illustrates the fields of the hyper-footnote database 260. FIG. 3c illustrates the fields of supplemental information database 270. FIG. 3d illustrates the fields of user information database 280 that information distribution system 100 uses to locate and distribute supplemental information and to collect payment for the distribution of supplemental information.

Printed information database 250 in FIG. 3a includes records 251 preferably having three fields: (1) document number 252, (2) document text 254, and (3) hyper-footnote list 256. Document number 252 is a unique alphanumeric used to identify a document that has been printed and for which additional or supplemental information exists. Document text 254 is the text of the document that has been printed. Hyper-footnote list 256 is a listing of one or more hyper-footnotes corresponding to supplemental information related to portions of the document.

Hyper-footnote database 260 in FIG. 3b includes records 261 preferably having four fields: (1) hyper-footnote identifier 262, (2) parent document number list 264, (3) hyper-footnote location 266, and (4) supplemental information number 268. Hyper-footnote identifier 262 is a unique alphanumeric used to identify each hyper-footnote. Hyper-footnote identifiers are found in the hyper-footnote list 256 for each document record 251 specified in the printed information database 250.

Parent document number list 264 includes document numbers 252 for records 251 of printed information database 250 corresponding to each of the hyper-footnotes in database 260. One hyper-footnote record 261 may relate to one or more document records 251 and vice versa. Hyper-footnote list 256 for each document record 251 relates hyper-footnote records 261 to document records 251. Parent document number list 264 for each hyper-footnote record 261 relates document records 251 to hyper-footnote records 261.

Hyper-footnote location 266 for each hyper-footnote record 261 indicates the location, such as page number and line number, of the hyper-footnotes within the document text field 254 of a document record 251 of printed information database 250. Finally, supplemental information number 268 is a unique identifier corresponding to each hyper-footnote record 261 and specifying an entry 271 in supplemental information database 270.

Supplemental information database 270 in FIG. 3c includes records 271 preferably having three fields: (1) supplemental information number 272, (2) supplemental information 274, and (3) length of the supplemental information 276. Supplemental information number 272 for each record 271 of supplemental information database 270 is a unique alphanumeric identifier corresponding to each entry 271. Identifier 272 is used to locate supplemental information corresponding to hyper-footnotes in supplemental information database 270. In addition to unique identifier 272, each supplemental information record 271 of database 270 includes supplemental information 274 as well as its length 276. In addition to text, supplemental information field 274 may contain audio, video, or another form of supplemental information to the printed text of a document. The length for each field 274 is used, for example, for output control and, if so configured, for determining the cost of providing the supplemental information in response to requests.

Finally, user information database 280 in FIG. 3d includes records 281 preferably having nine fields: (1) customer identification number 282, (2) customer name 284, (3) customer address 286, (4) customer telephone number 288, (5) customer facsimile telephone number 290, (6) customer e-mail address 292, (7) credit card type and number 294, (8) preferred delivery means 296, and (9) account balance 298.

Customer identification number 282 is a unique identifier corresponding to each customer registered to receive supplemental information upon request. Name field 284 holds the name of the customer and address field 286 holds the customer's street address. Phone number field 288 is for each customer's telephone number, and fax number field 290 is for a separate telephone number dedicated for a facsimile machine, if available. E-mail address field 292 is for the customer's e-mail address, if available, and credit card number field 294 is for the customer's credit card type and number.

Preferred delivery service field 296 is for the customer's selected method to receive requested supplemental information. Such methods may include, for example, regular mail, or a faster courier service such as FedEx, DHL Courier, etc. Facsimile and e-mail are additional methods for delivering requested supplemental information. Another available delivery method is to send any requested supplemental information to an address on the World Wide Web.

Lastly, each record 281 includes account balance field 298. If the customer has requested, for example, invoice billing, account balance field 298 may be used to bill the customer. Alternatively, account balance field 298 may be used to bill the customer's credit card by sending a payment request to the appropriate credit card processing company.

Figure 4:
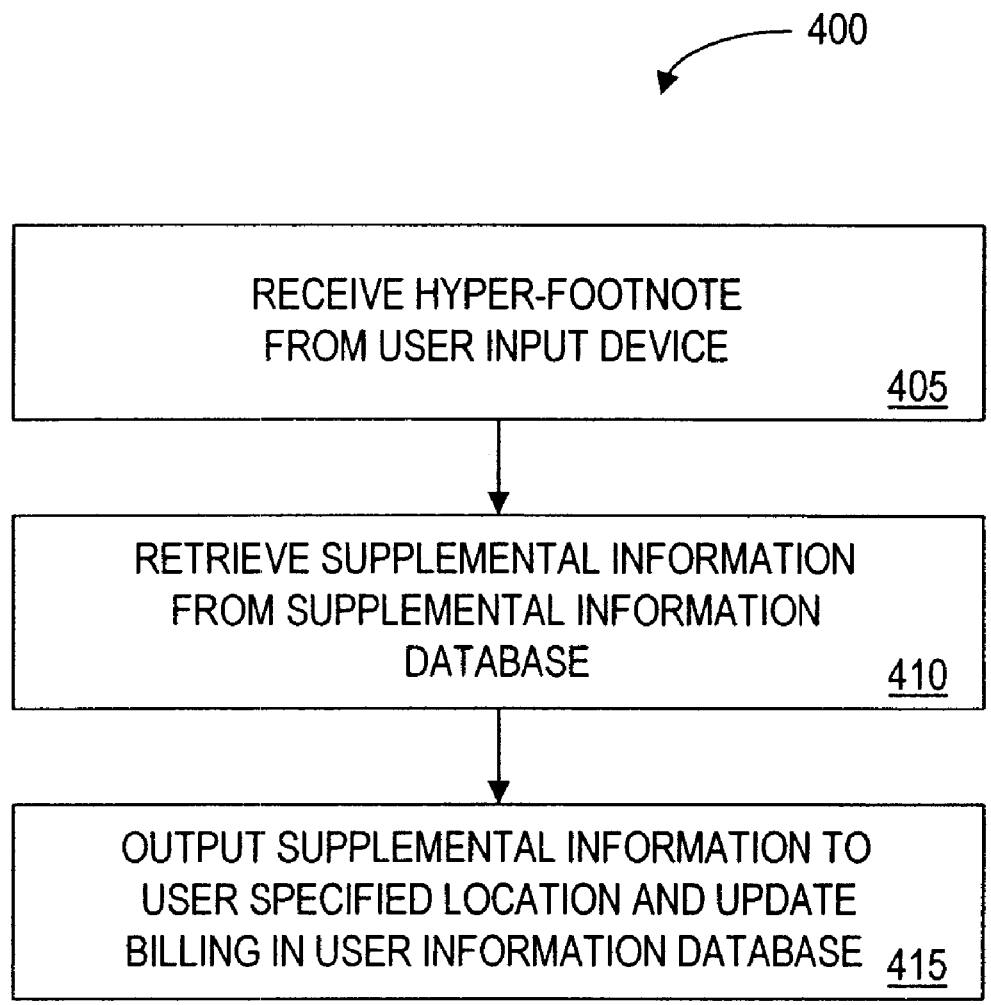
FIG. 4 is a flow chart of an operation of the information distribution system to process requests for supplemental information.

FIG. 4 is a flow chart of the general procedure 400 used by central controller 200 to provide supplemental information using databases 250–280. Central controller 200 first receives a request for supplemental information from a user input device such as a telephone or computer (step 405). The request includes a hyper-footnote from a print media. Central controller 200 uses the input hyper-footnote to retrieve any supplemental information from supplemental information database 270 (step 410). Central controller 200 then outputs the located supplemental information to a specified user output device (step 420). The output device may be specified by the user as part of the initial request for supplemental information or an output device specified for the user in user information database 280. Further, central controller 200 updates billing information in user information database 280 to reflect the "purchase" (transmission) of requested supplemental information (step 420).

Figure 5A:
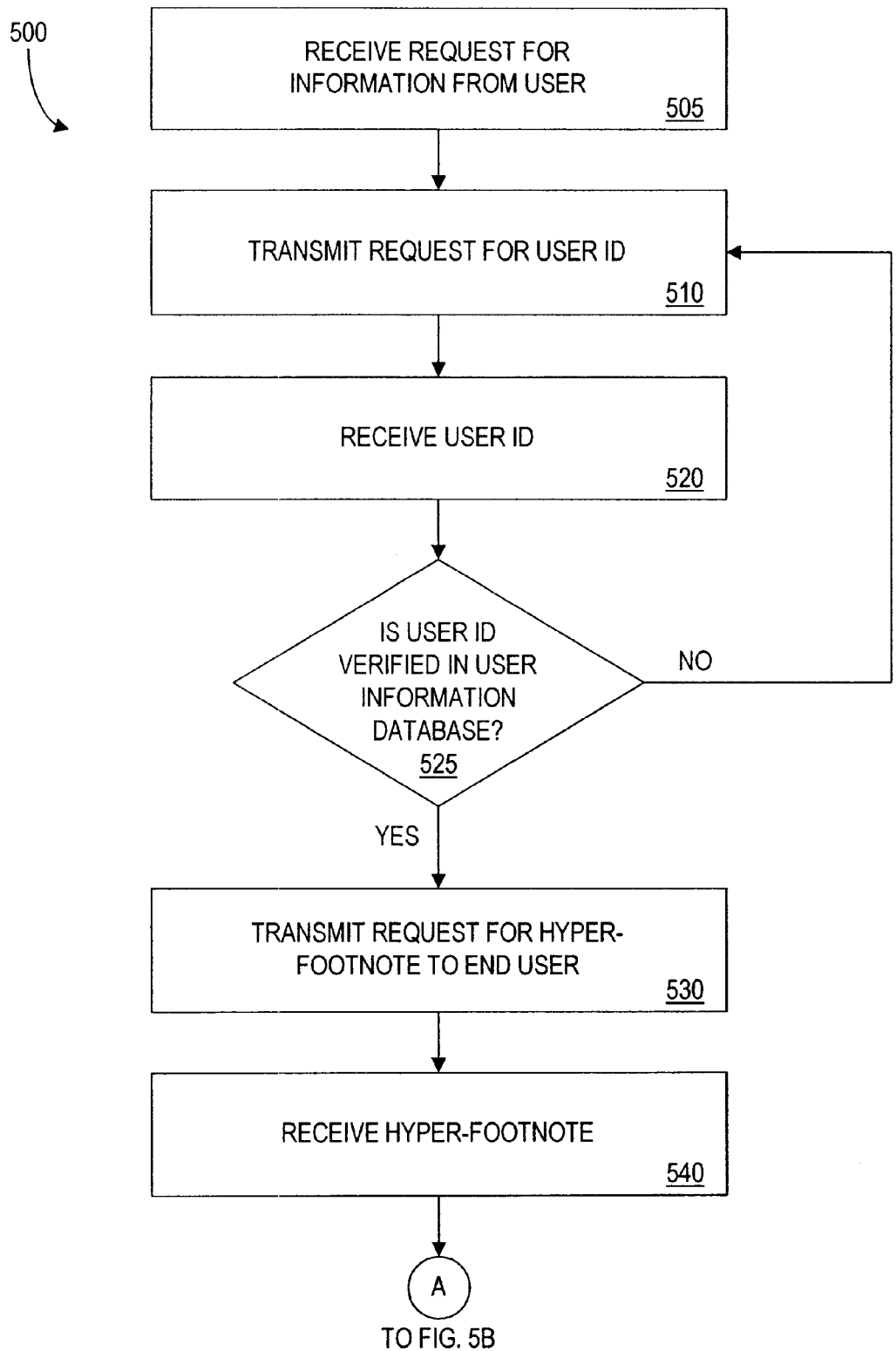
FIGS. 5a and 5b is a flow chart of a procedure used by the central controller to process requests for supplemental information.
Figure 5B:
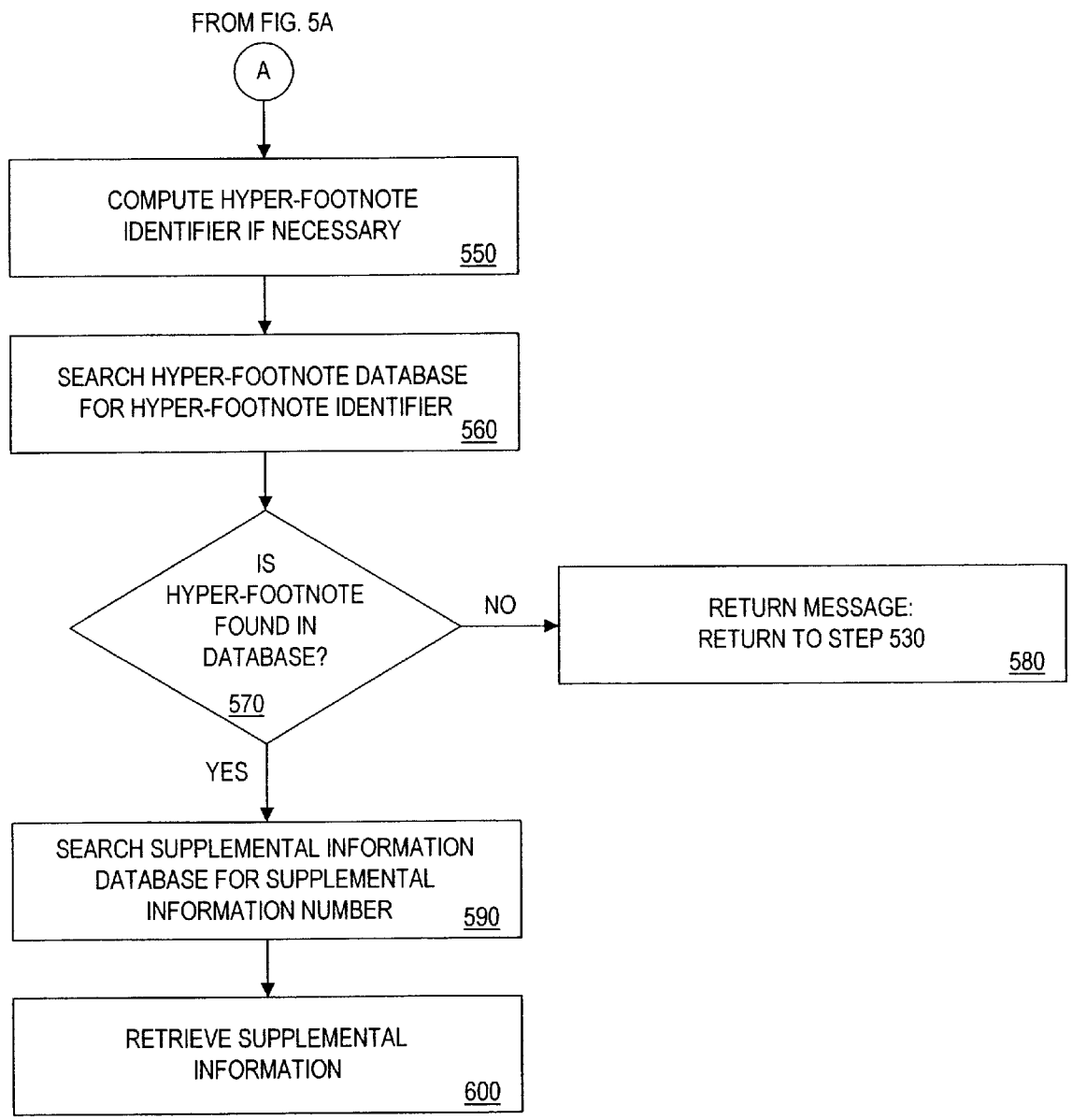

FIGS. 5a and b illustrate a more detailed flow chart of the procedure 500 used by central controller 200 executing the software of the request processor 247 to process requests for supplemental information. After a service customer connects input device 120 to central controller 200 via telephone network 110, central controller 200 recognizes this connection as a request for supplemental information from the user (step 505), and then prompts the user for a user identification number (step 510). With certain input devices, such as telephones, users can input a user identification number using either a number pad or voice input.

After central controller 200 receives the user's identification number (step 520), it determines whether the received number corresponds to a number in user information database 280 (step 525). If not, then central controller 200 prompts the user again for a user identification number (step 510). This process is repeated a predetermined number of times or until the user provides the proper identification number, which ever occurs first. If the predetermined number of times for prompting the user for an identification number is reached, then central controller 200 disconnects the user's input device.

After the user provides a proper customer identification number (step 525), central controller 200 prompts that user for a desired hyper-footnote corresponding to a portion of a printed document (step 530). Central controller 200 then receives the desired hyper-footnote from the user (step 540). This process may time out if the user waits too long before responding to any of the prompts for input. If the process times out, then the user's connection to central controller 200 will be disconnected.

The desired hyper-footnote may be a code embedded in the text of the printed article or a portion of the printed article itself. In the latter situation, the hyper-footnote may be represented in the article in a variety of different ways. When using a method other than embedded codes to indicate the existence of a hyper-footnote, it may also be necessary to provide further information in the printed article, for example, a number identifying the printed article as well as the line number corresponding to the portion constituting a hyper-footnote.

The following text shows two different types of hyper-footnotes:

1 Winston Churchill was an extraordinary man.[125]
2 His *contributions to history* are well documented in
3 a number of texts and his *sense of humor* has been
4 recounted by numerous historians.

In this example, the number 125 in the brackets [ ] represents one type of hyper-footnote that may appear in a printed article, and the underlined and italicized phrases are another type of hyper-footnote. The underlined and italicized phrases are examples of the type of hyper-footnote where text is altered to distinguish the phrase to which corresponding supplemental information exists from the remaining text of the article. The first type of hyper-footnote represents general information available on Mr. Churchill. The second refers to information detailing Mr. Churchill's contributions to history, and the third refers to stored audio and/or video of an author discussing a humorous story concerning Mr. Churchill. In all three cases, the information referred to by the hyper-footnotes constitutes supplemental information available through the central controller 200.

Different types of hyper-footnotes may be used to distinguish between different types of supplemental information such as textual, audio, or video information. Thus, by viewing the particular hyper-footnote, the reader may determine whether the available supplemental information is text, audio, video, or some other form.

For the second and third example hyper-footnotes, request processor 247 computes a hyper-footnote. For example, the user would identify a hyper-footnote as a combination of an article number and the number of the line of the text for which supplemental information exists. Therefore, after the user inputs a request for a desired hyper-footnote, central controller 200 computes the hyper-footnote identifier, if necessary (step 550). Then, central controller 200, operating under the instruction of request processor 247, searches in hyper-footnote database 260 for the hyper-footnote (step 560), and determines whether the hyper-footnote was in database 260 (step 570). If not, request processor 247 generates and outputs to the user a message indicating that the input hyper-footnote could not be located in database 260, and the process prompts the user for another hyper-footnote (step 580 and step 530). If so, central controller 200 searches supplemental information database 270 for the supplemental information number found in database 260 and corresponding to the input hyper-footnote (step 590), and retrieves the stored supplemental information corresponding to the hyper-footnote (step 595).

Figure 6:
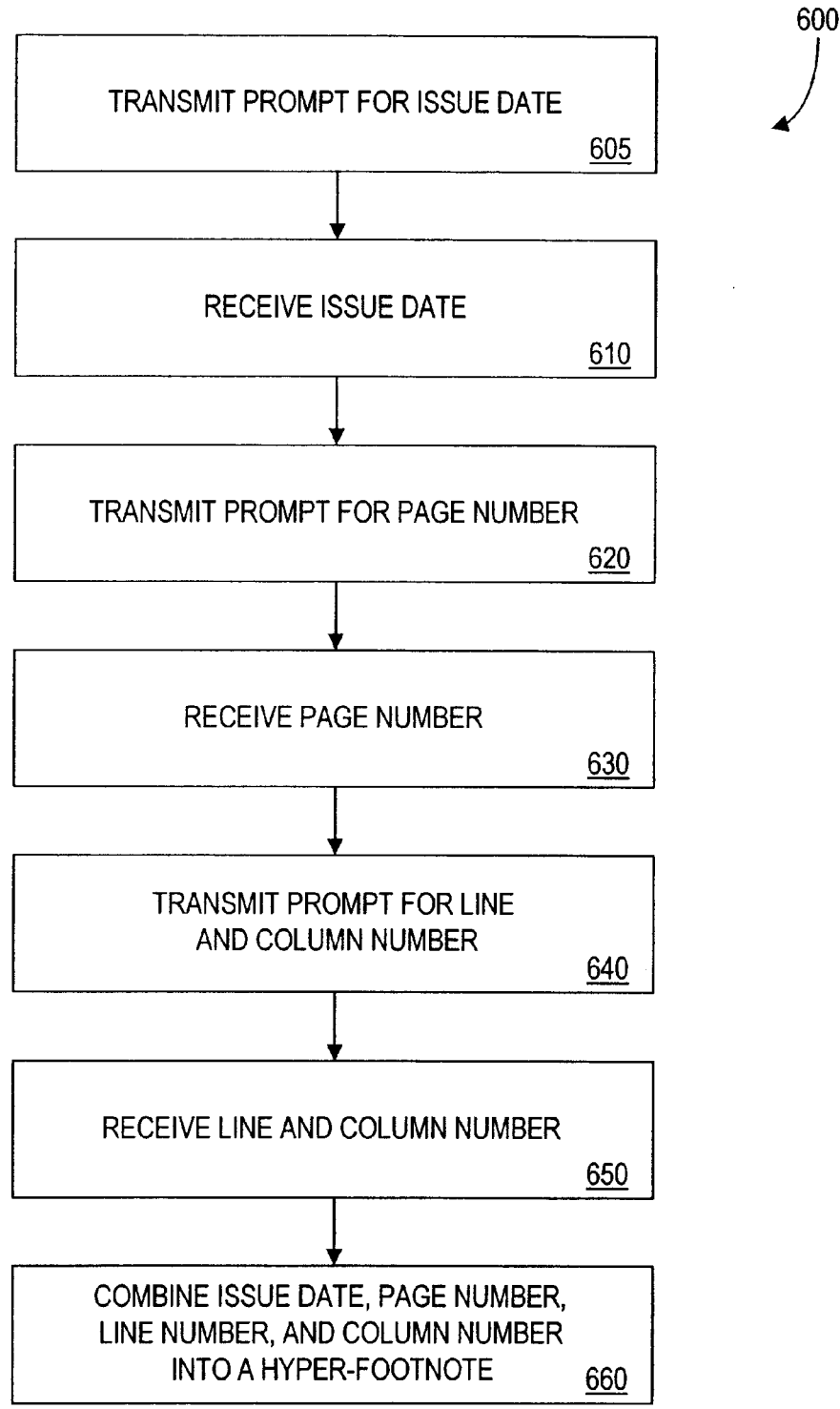
FIG. 6 is a flow chart of a procedure used by the central controller to compute a hyper-footnote corresponding to requested supplemental information.

FIG. 6 is a flow chart of a preferred procedure 600 used by central controller 200 to compute a hyper-footnote corresponding to requested supplemental information when the hyper-footnote may not be embedded or printed with the rest of a document.

Central controller 200 prompts the user for an issue date corresponding to the issue of the document containing the desired hyper-footnote (step 605). After central controller 200 receives the issue date (step 610), it prompts the user for a page number of the document containing the desired hyper-footnote (step 620), and receives that number (step 630).

Central controller 200 prompts the user for a column and/or line number for the hyper-footnote (step 640), and receives this information (step 650). Finally, central controller 200 combines the information to generate a hyper-footnote that may be found in database 260. The hyper-footnote may be identified by an identifier that is simply the concatenation of the issue date, page number, column number, and line number, or it may be computed based on some other combination of this information.

Using the example specified above, the user may provide an issue date for The New York Times Magazine that included an article on Winston Churchill and the specific passage discussed above. Those skilled in the art will recognize that there are alternative methods to represent hyper-footnotes in the text of an article without embedding the code itself in the article. This description of a method for calculating hyper-footnotes is not intended to limit the present invention to only that method; rather, it is intended to illustrate an exemplary method to represent hyper-footnotes.

Figure 7:
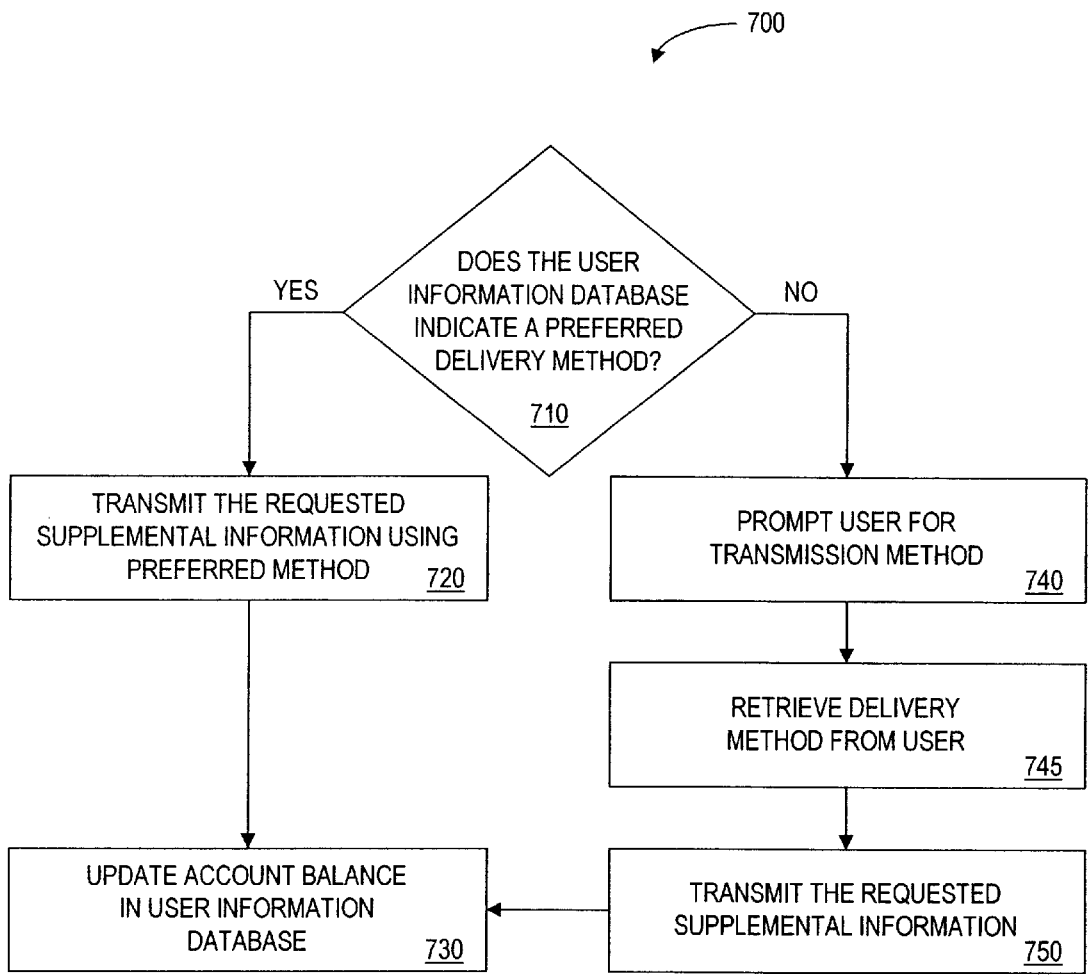
FIG. 7 is a flow chart of a procedure used by the central controller to transmit requested supplemental information.

After the requested hyper-footnote is referenced, the request processor 247 preferably implements a software procedure 700 (FIG. 7) to transmit requested supplemental information to the user and bill the customer for the requested information. Using the customer identification number provided by the user when requesting supplemental information, central controller 200 determines whether the user has selected a preferred method for receiving requested supplemental information (step 710). If so, central controller 200 transmits the requested supplemental information using the selected method (step 720). Otherwise, central controller 200 prompts the user for a delivery method (step 740), references details about the method from the user, and then transmits the supplemental information using the selected method (step 750).

In either case, as a last step central controller 200 updates the account balance in the user's account balance in user information database 280 to reflect the transmission of requested supplemental information (step 730).

Figure 8:
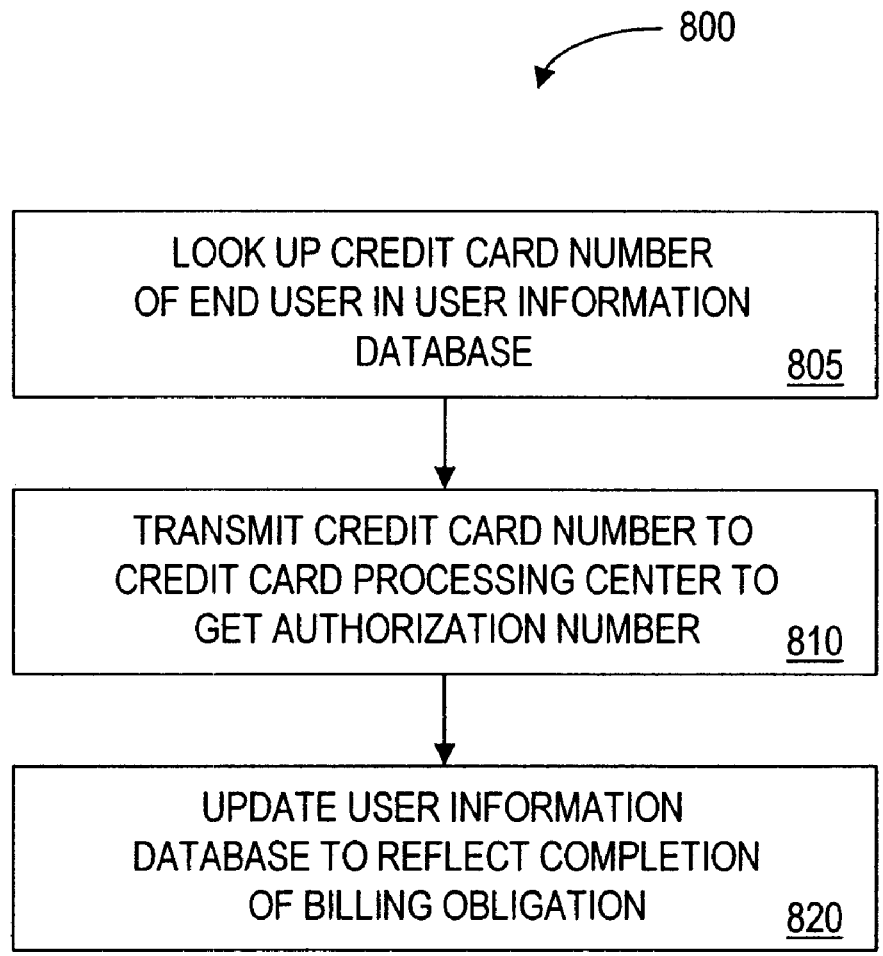
FIG. 8 is a flow chart of a procedure used by the central controller to obtain payment for requested supplemental information.

FIG. 8 is a flow chart of a procedure 800 used by central controller 200, under instruction of the request processor 247, to process payment for requested supplemental information using a conventional credit card transaction. Using the customer identification number, central controller 200 looks up the corresponding credit card number in user information database 280 (step 805). Central controller 200 then transmits the credit card number to an appropriate credit card processing center for an authorization number (step 810).

Central controller 200 connects to the credit card processing center via public switched telephone network 110. Assuming authorization is received, central controller 200 then updates the user account balance corresponding to the customer identification number of user information database 280 to reflect completion of the billing obligation (step 820). The credit card processing center compensates the supplier of supplemental information for the transmission of requested information to a user, and bills the user as part of its billing procedures.

Alternative billing methods may be used as well, without detracting from the scope of the present invention. For example, central controller 200 may, at periodic intervals, review the account balance fields 298 for records in user information database 280 to determine whether any accounts have balances that should be billed. For these accounts, central controller 200 would generate bills to be sent to the customers at the appropriate addresses specified in the user information database 280.

The present invention thus provides a practical and economically feasible system for publishers to sell to their readers valuable supplement information, which is often developed in the routine process of business but otherwise wasted, related to information found in print material. This is accomplished by providing readers with hyper-footnotes, a simple means to identify whether supplemental information exists, and a mechanism to communicate with a central controller to obtain the supplemental information corresponding to the hyper-footnotes.

The foregoing description of an implementation of the invention has been presented for purposes of illustration and description. It is not intended to be exhaustive or to limit the invention to the precise form disclosed. Modifications and variations are possible in light of the above teachings or may be acquired from practice of the invention. The scope of the invention is defined by the claims and their equivalents.

What is claimed is:

1. A method for providing supplemental information to readers, comprising the steps of:

providing standard-length printed articles intended to inform a reader;

embedding in the midst of at least one of said printed articles a code;

said code physically positioned to identify a limited portion of information in said printed article;

providing an electronic database containing supplemental information about said limited portion of information in said article;

providing means by which said reader can use said code to indicate further interest in said supplemental information; and permitting said reader to select a method of delivery whereby said supplemental information in said database can be delivered to said reader.

2. The method of claim 1, wherein the step of providing standard-length printed articles includes the substep of:

printing one of a newspaper, magazine, or similar printed media.

3. An apparatus comprising:

an electronic database containing supplemental information corresponding to limited portions of information in printed articles, at least one of said printed articles being embedded with a code physically positioned to identify a limited portion of information in said printed article and for which said electronic database contains supplemental information;

indicating means configured to permit a reader to use said code to indicate further interest in said supplemental information; and selection means configured to permit said reader to select a method of delivery whereby said supplemental information in said database can be delivered to said reader.

4. A method for providing supplemental information to readers, comprising the steps of:

providing standard-length printed articles intended to inform a reader;

embedding in the midst of at least one of said articles a code;

said code physically positioned to identify a limited portion of information in said article; and providing written instructions associated with said article which permit said reader to access a remote electronic database containing supplemental information relating to said limited portion of information in said article, utilize said code to indicate further interest directly in said supplemental information, and select a method of delivering said supplemental information in said database to said reader.

5. The method of claim 4, wherein the step of providing standard-length printed articles includes the substep of:

printing one of a newspaper, magazine, or similar printed media.

6. A method for providing supplemental information to readers, comprising the steps of:

receiving from a reader a code, said code indicating a limited portion of information in an otherwise standard-length printed article, said article intended to inform the reader;

utilizing said code to identify a portion of an electronic database containing supplemental information about said article;

providing to said reader a selection of methods of delivery of said supplemental information to said reader; and initiating delivery of said supplemental information from said electronic database to said reader in accordance with said reader's selection of a method of delivery.

7. The method of claim 6, further comprising the step of:

updating an account balance for the reader to reflect the delivery of said supplemental information.

8. The method of claim 6, further comprising the step of:

billing the reader for the delivery of said supplemental information.

9. The method of claim 6, further comprising the step of:

notifying a third party to bill the reader for the delivery of said supplemental information.

10. An apparatus comprising:

a receiver configured to receive from a reader a code, said code indicating a limited portion of information in an otherwise standard-length printed article, said article intended to inform the reader;

an identifier configured to permit said reader to utilize said code to identify a portion of an electronic database containing supplemental information about said article;

delivery selection means configured to provide said reader a selection of methods of delivery of said supplemental information to said reader; and initiating means configured to initiate delivery of said supplemental information from said electronic database to said reader in accordance with said reader's selection of a method of delivery.

11. A method for providing supplemental information to readers, comprising the steps of:

receiving from a reader a code, said code indicating a limited portion of information in an otherwise standard-length printed article, said article intended to inform the reader;

contacting a remote electronic database;

utilizing said code to identify a portion of said remote electronic database containing supplemental information to said article;

providing to said reader a selection of methods of delivery of said supplemental information to said reader; and initiating delivery of said supplemental information from said remote database to said reader in accordance with said reader's selection of method of delivery.

12. The method of claim 11, further comprising the step of:

updating an account balance for the reader to reflect the delivery of said supplemental information.

13. The method of claim 11, further comprising the step of:

billing the reader for the delivery of said supplemental information.

14. The method of claim 11, further comprising the step of:

notifying a third party to bill the reader for the delivery of said supplemental information.

15. An apparatus comprising:

a receiver configured to receive from a reader a code, said code indicating a limited portion of information in an otherwise standard-length printed article, said article intended to inform the reader;

contacting means configured to contact a remote electronic database;

an identifier configured to utilize said code to identify a portion of said remote electronic database containing supplemental information to said article;

selection means configured to provide to said reader a selection of methods of delivery of said supplemental information to said reader; and delivery means configured to initiate delivery of said supplemental information from said remote database to said reader in accordance with said reader's selection of method of delivery.

16. A method of distributing supplemental information corresponding to a printed article intended to inform a reader, comprising the steps of:

receiving from the reader a request identifying a code in the printed article, the code physically positioned in the printed article to indicate the existence of supplemental information related to a limited portion of information in the printed article;

receiving from the reader a selected method of delivery;

retrieving from storage the supplemental information corresponding to the code;

sending the retrieved information to the reader in accordance with the selected method of delivery.

17. The method of claim 16 wherein the sending step includes the substep of:

transmitting the retrieved supplemental information as an E-mail response.

18. The method of claim 16 wherein the sending step includes the substep of:

transmitting the retrieved information via facsimile.

19. The method of claim 16, further including the step of:

generating a bill for the retrieved information.

20. The method of claim 19 wherein the bill generating step includes the substep of:

receiving credit card information from the reader.

21. The method of claim 19 wherein the bill generating step includes the substep of:

using a telephone system billing number.

22. The method of claim 16, wherein the receiving step includes the substep of:

obtaining in the request an identification of an output device; and wherein the sending step includes the substep of:

transmitting the supplemental information to the output device identified in the request.

23. The method of claim 16, wherein the sending step includes the substep of:

transmitting an error notification when no supplemental information corresponding to the request can be retrieved from storage.

24. The method of claim 16, wherein the receiving step includes the substep of;

obtaining a numeric identifier embedded in the printed article and distinguishable from the remainder of the article.

25. The method of claim 16, wherein the receiving step includes the substep of:

obtaining an identifier corresponding to the printed article and a location of the identified portion within the printed article.

26. The method of claim 16, wherein the receiving step includes the substep of:

obtaining an identification for the identified portion of the printed article, the identified portion represented by an altered appearance within the printed article.

27. The method of claim 16, wherein the retrieving step includes the substep of:

decoding the code to identify a location of the supplemental information.

28. An apparatus for distributing supplemental information corresponding to a printed article intended to inform a reader comprising:

a receiver configured to receive from the reader (i) a request identifying a code in the printed article, the code physically positioned in the printed article to indicate the existence of supplemental information related to a limited portion of information in the printed article and (ii) a selected method of delivery;

retrieving means configured to retrieve from storage the supplemental information corresponding to the code;

sending means configured to send the retrieved information to the reader in accordance with the selected method of delivery.

29. The apparatus of claim 28 wherein the sending means includes:

a transmitter configured to transmit the retrieved supplemental information as an E-mail response.

30. The apparatus of claim 28 wherein the sending means includes:

a transmitter configured to transmit the retrieved information via facsimile.

31. The apparatus of claim 28, further comprising:

a bill generator configured to generate a bill for the retrieved information.

32. The apparatus of claim 31 wherein the bill generator includes:

a receiver configured to receive credit card information from the reader.

33. The apparatus of claim 31, wherein the receiver includes:

obtaining means configured to receive in the request an identification of an output device; and wherein the sending means includes:

a transmitter configured to transmit the supplemental information to the output device identified in the request.

34. The apparatus of claim 28, wherein the sending means includes:

a transmitter configured to transmit an error notification when no supplemental information corresponding to the request can be retrieved from storage.

35. The apparatus of claim 28, wherein the receiver includes:

obtaining means configured to receive a numeric identifier embedded in the printed article and distinguishable from the remainder of the article.

36. The apparatus of claim 28, wherein the receiver includes:

obtaining means configured to receive an identifier corresponding to the printed article and a location of the identified portion within the printed article.

37. The apparatus of claim 28, wherein the receiver includes:

obtaining means configured to receive an identification for the identified portion of the printed article, the identified portion represented by an altered appearance within the printed article.

38. The apparatus of claim 28, wherein the retrieving means includes:

a decoder configured to decode the code to identify a location of the supplemental information.

39. A method for providing supplemental information to readers, comprising the steps of:

providing to said reader means to identify a location code associated with a limited portion of information physically positioned in the midst of at least one article;

providing an electronic database containing supplemental information about said limited portion of information in said article;

providing means by which said reader can use said location code to indicate further interest in said supplemental information; and permitting said reader to select a method of delivery whereby said supplemental information in said database can be delivered to said reader.

* * * * *